United States Patent
Gaignet et al.

(10) Patent No.: US 9,926,210 B2
(45) Date of Patent: Mar. 27, 2018

(54) SYSTEM AND METHOD FOR PURIFICATION AND DISTRIBUTION OF WATER WITH SEPARATION BARRIER TAKING AWAY THE BIOLOGICAL CONTAMINATION

(75) Inventors: Yves Gaignet, Montigny le Bretonneux (FR); Didier Meyer, Paris (FR); Julien Bole, Montigny le Bretonneux (FR)

(73) Assignee: EMD Millipore Corporation, Burlington, MA (US)

( * ) Notice: Subject to any disclaimer, the term of this patent is extended or adjusted under 35 U.S.C. 154(b) by 130 days.

(21) Appl. No.: 14/125,412

(22) PCT Filed: Jun. 20, 2012

(86) PCT No.: PCT/IB2012/053114
§ 371 (c)(1),
(2), (4) Date: Dec. 11, 2013

(87) PCT Pub. No.: WO2012/176134
PCT Pub. Date: Dec. 27, 2012

(65) Prior Publication Data
US 2014/0124455 A1    May 8, 2014

(30) Foreign Application Priority Data
Jun. 24, 2011  (FR) ...................... 11 55630

(51) Int. Cl.
*B01D 61/00* (2006.01)
*C02F 1/44* (2006.01)
(Continued)

(52) U.S. Cl.
CPC .............. *C02F 1/32* (2013.01); *C02F 9/005* (2013.01); *C02F 1/44* (2013.01)

(58) Field of Classification Search
CPC ...... C02F 1/32; C02F 2201/002; C02F 1/325; C02F 1/444; B01D 61/145; B01D 61/147; B01D 61/58
(Continued)

(56) References Cited

U.S. PATENT DOCUMENTS 3,870,033 A * 3/1975 Faylor .................... B01D 61/08
                                                    165/163
3,992,301 A   11/1976 Shippey et al.
(Continued)

FOREIGN PATENT DOCUMENTS

CN  1196884 A    10/1998
CN  200961108 Y  10/2007
(Continued)

OTHER PUBLICATIONS

English translation of Japanese communication dated Apr. 7, 2015 in co-pending Japanese patent application No. 2014-516478.
(Continued)

*Primary Examiner* — Ana Fortuna
(74) *Attorney, Agent, or Firm* — Nields, Lemack & Frame, LLC

(57) ABSTRACT

The invention concerns a treated water purification system (18) comprising a closed water flow loop (107) said loop comprising at least one treated water supply point (A), at least one point of use (U) of purified water, a pump means (101), a sterilization means (106) and a filtration means (103), characterized in that the zone (106) comprises the supply point (A) and a water extraction point (P), situated upstream of the supply point (A), and in that the extraction point (P) and the supply point (A) are both situated in a sector (106B) of the sterilization zone (106) that is isolated from the two connection points ($R_M$, $R_V$) of the loop (107)
(Continued)

Figure 3:
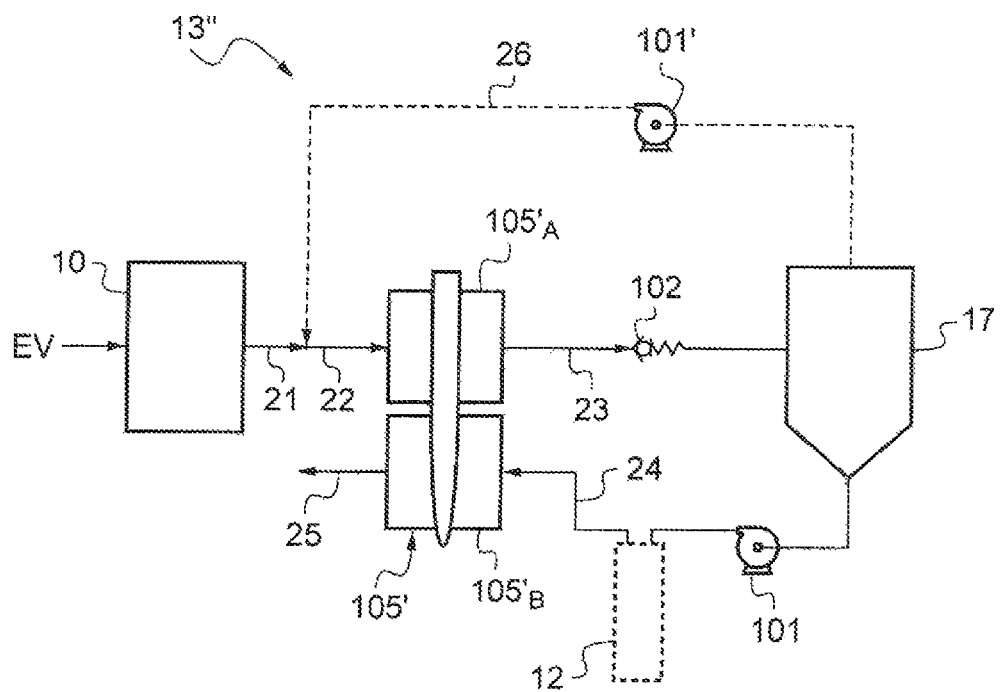

to the zone (106) by two other sectors (106A, 106C) of the zone (106). Method for use of such a system.

16 Claims, 3 Drawing Sheets

(51) Int. Cl.
    *C02F 1/78*     (2006.01)
    *C02F 9/00*     (2006.01)
    *B01D 63/00*     (2006.01)
    *C02F 1/32*     (2006.01)

(58) Field of Classification Search
    USPC .............................. 210/900, 651, 760, 748.1
    See application file for complete search history.

(56) References Cited

U.S. PATENT DOCUMENTS

| | | | |
|---|---|---|---|
| 4,261,834 A | | 4/1981 | deWinter |
| 4,495,067 A | | 1/1985 | Klein et al. |
| 4,623,467 A | | 11/1986 | Hamlin |
| 4,698,153 A | * | 10/1987 | Matzuzaki ......... B01D 11/0203 210/192 |
| 4,773,993 A | | 9/1988 | Yoda et al. |
| 4,801,375 A | | 1/1989 | Padilla |
| 4,810,388 A | | 3/1989 | Trasen |
| 4,969,991 A | | 11/1990 | Valadez |
| 5,024,766 A | | 6/1991 | Mahmud |
| 5,259,954 A | | 11/1993 | Taylor |
| 5,762,789 A | | 6/1998 | de los Reyes et al. |
| 5,769,539 A | | 6/1998 | Tsang et al. |
| 5,851,390 A | | 12/1998 | Lemonnier |
| 5,911,884 A | | 6/1999 | Boulter |
| 5,935,441 A | * | 8/1999 | O'Neill ................. C02F 1/32 210/638 |
| 6,074,551 A | | 6/2000 | Jones et al. |
| 6,146,524 A | | 11/2000 | Story |
| 6,264,836 B1 | | 7/2001 | Lantis |
| 6,464,867 B1 | * | 10/2002 | Morita ................ B01F 3/04985 210/202 |
| 7,250,619 B2 | | 7/2007 | Taylor et al. |
| 8,480,906 B2 | * | 7/2013 | Kobayashi ................ C02F 9/00 210/660 |
| 2002/0179508 A1 | | 12/2002 | Nachtman et al. |
| 2003/0057155 A1 | | 3/2003 | Husain et al. |
| 2003/0094406 A1 | | 5/2003 | Smith |
| 2004/0050762 A1 | | 3/2004 | Xia et al. |
| 2004/0232079 A1 | | 11/2004 | Taylor et al. |
| 2005/0061737 A1 | | 3/2005 | Linden et al. |
| 2006/0091077 A1 | | 5/2006 | Haas et al. |
| 2008/0230450 A1 | | 9/2008 | Burbank et al. |
| 2009/0084734 A1 | | 4/2009 | Yencho |
| 2009/0134080 A1 | | 5/2009 | Fabig |
| 2014/0102990 A1 | | 4/2014 | Gaignet et al. |

FOREIGN PATENT DOCUMENTS

| | | |
|---|---|---|
| CN | 201648052 U | 11/2010 |
| DE | 20-2005-011219 U1 | 9/2005 |
| EP | 0096377 A1 | 12/1983 |
| EP | 2132913 A | 7/1984 |
| EP | 0385050 A1 | 9/1990 |
| EP | 0417506 A1 | 3/1991 |
| EP | 1875818 A2 | 1/2008 |
| FR | 2425881 A1 | 12/1979 |
| FR | 2896792 A1 | 8/2007 |
| GB | 2070900 A | 9/1981 |
| JP | 6-277665 A | 10/1994 |
| JP | 6-304559 A | 11/1994 |
| JP | 7-60291 A | 3/1995 |
| JP | 8-252440 A | 10/1996 |
| JP | 8-252600 A | 10/1996 |
| JP | 10-151464 A | 6/1998 |
| JP | 10-337567 A | 12/1998 |
| JP | 11-244895 A | 9/1999 |
| JP | 3223660 B2 | 10/2001 |
| JP | 2005-254193 A | 9/2005 |
| JP | 2009-285565 A | 12/2009 |
| WO | 00/12435 A1 | 3/2000 |
| WO | 2009/044288 A2 | 4/2009 |

OTHER PUBLICATIONS

International Search Report and Written Opinion dated Sep. 26, 2012 in corresponding PCT application No. PCT/IB2012/053114.
International Preliminary Report on Patentability dated Jan. 9, 2014 in corresponding PCT application No. PCT/IB2012/053114.
International Search Report and Written Opinion dated Sep. 26, 2012 in co-pending PCT application No. PCT/IB2012/053115.
International Preliminary Report on Patentability dated Jan. 9, 2014 in co-pending PCT application No. PCT/IB2012/053115.
Office Action dated Sep. 21, 2015 in co-pending U.S. Appl. No. 14/125,424.
Final rejection dated Jan. 19, 2017 in co-pending U.S. Appl. No. 14/125,424.
Final rejection dated Apr. 4, 2016 in co-pending U.S. Appl. No. 14/125,424.
Office action dated Jul. 19, 2016 in co-peding U.S. Appl. No. 14/125,424.
Notice of allowance dated Jun. 23, 2017 in co-pending U.S. Appl. No. 14/125,424.

\* cited by examiner

FIG. 1 (Prior art)
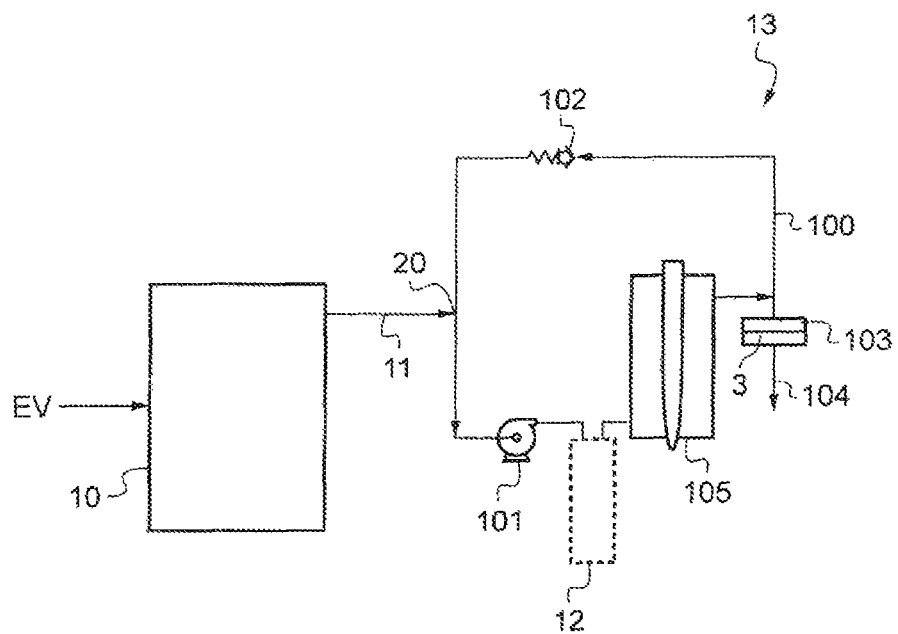
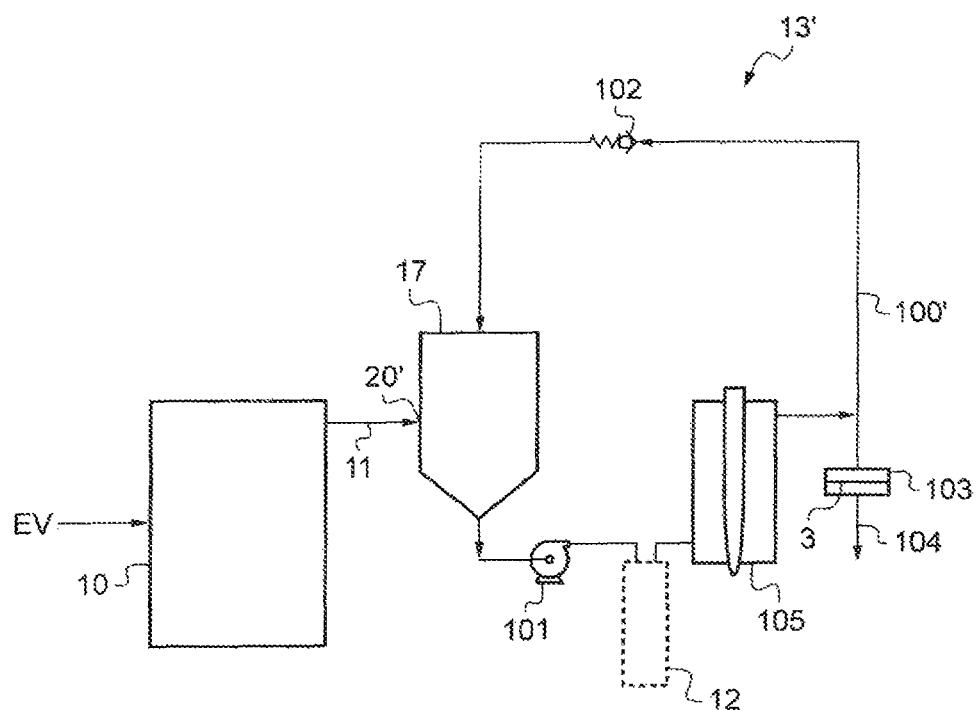
Fig. 2 (Prior Art)

SYSTEM AND METHOD FOR PURIFICATION AND DISTRIBUTION OF WATER WITH SEPARATION BARRIER TAKING AWAY THE BIOLOGICAL CONTAMINATION

The present invention relates to a system for purifying and dispensing water, in particular equipped with a purified water flow loop. The invention also relates to a method of purifying and dispensing water using that system.

Numerous applications, in particular in analytical chemistry and analytical biology laboratories, require the use of pure or even ultra-pure water. These systems are also used for medical treatments, for example dialysis, or for biological analyzers (for blood, urine, etc.) which require a very high level of purification.

Water purification systems have been designed to produce water of the desired quality.

Thus the patent documents US 2008/0230450, U.S. Pat. No. 7,250,619, U.S. Pat. No. 5,259,954, U.S. Pat. No. 4,495,067, U.S. Pat. No. 4,810,388 and EP 1 875 818 describe methods of producing purified water using several steps of water treatment in line including ultraviolet lamps and disposable filters.

The patent document JP 3 223 660 describes in particular the storage of purified water in a tank at 80° C., before dispensing in line through an ultrafiltration filter.

FIGS. 1, 2 and 3 illustrate systems 13, 13' and 13" for purifying and dispensing pure or even ultra-pure water, according to the state of the art.

The systems 13 and 13' are commonly used for applications in analytical biology and analytical chemistry laboratories. These systems are also used for medical treatments, for example dialysis, or to supply biological analyzers.

In FIG. 1, the system 13 for purifying and dispensing water is associated with a treated water production system 10, which produces treated water from tap water EV for example, in a manner known to the person skilled in the art, for example by reverse osmosis and electrodeionization. The treated water production system 10 is generally in the form of a circuit called the primary circuit.

The system 13 produces pure or ultra-pure purified water, ready to be dispensed to a user of that treated water. The system 13 is mainly constituted by a circuit 100 which is a closed loop for purified water flow. The circuit 100 is generally called secondary circuit.

The system 10 supplies treated water to the flow loop 100 by a pipe 11 which enters the loop 100, at a supply point 20. Downstream of the supply point 20 in the direction of water flow, the loop 100 comprises a pump 101, an ultraviolet (UV) lamp 105, generally emitting at 254 nm, and a filtration component 103 which is generally a microfiltration filter 103 comprising a filter membrane 3. The pump 101 enables a stream to be maintained within the flow loop 100 and to compensate for the head losses in the different water purification components and in the hydraulic circuit. The filter 103 is mounted on a diversion from the loop 100.

The point of use 104 from which the user draws off the purified water from the system 13 is situated downstream of the filter 103. The purified water not drawn off by the user continues to flow in the closed loop 100, towards the inlet of the pump 101, via a valve 102. The valve 102 generates sufficient back-pressure at the inlet of the filter 103 to obtain flow at the dispensing point 104. The flow from the pump 101, at the opening pressure of the valve, enables the purified water to flow in the loop 100. The valve 102 is of the calibrated valve or discharge valve type.

The water purifying and dispensing system 13 may be completed by at least one component 12 for water treatment. The component 12 is generally of the ion exchange resin cartridge type, and/or of the cartridge type containing materials for the adsorption of organic matter and/or the ultrafiltration type. The component 12 is preferably placed between the pump 101 and a UV lamp 105 (as shown in FIG. 1). According to a variant not shown, component 12 may also be placed between the UV lamp 105 and the filter 103. The component 12 may enable elimination of residual ions, organic matter, particles or pyrogens contained in the water produced by the system 10. Component 12 is represented in dashed line in FIG. 1. If component 12 is not present, a simple pipe links the pump 101 to the UV lamp 105.

The system 13' of FIG. 2 represents a variant of the system 13 of FIG. 1, in which the loop 100' comprises, instead of a simple supply point 20, a tank 17. The system 13' is mainly constituted by a circuit 100' which is a closed loop for purified water flow. Tank 17 is supplied both by the water produced by the treated water production system 10 via pipe 11, and by the purified water not extracted at the point of use 104, which arrives at the upstream side of the tank 17 after passage via the valve 102. The pump 101 is connected to the outlet from that tank 17.

The system 13' furthermore enables intermittent recycling of the water from the tank 17 by circulation in the loop 100', independently of any drawing off by the user. This for example makes it possible not to let the water stagnate for too long a time in the tank 17, during the periods in which no extraction by the user is made.

According to a variant not represented, it is possible to eliminate the water flow in the part of the loop 100' between the filter 103 and the tank 17, the water being distributed in line, on demand, at the point of use 104.

FIG. 3 illustrates a particular system 13" described in U.S. Pat. No. 4,969,991 A, which includes the components of the system described in FIG. 2, except for the fact that the UV lamp is able to sterilize two distinct circuits. The system 13" constitutes a production line, and does not comprise an actual closed loop for purified water flow, as will be explained below, but the treated water contained in the tank 17 may flow, independently of any extraction by the user, via the loop 26 to be purified by virtue of its passage in a UV lamp 105'.

In FIG. 3, a UV lamp 105' possesses two separate and independent hydraulic circuits 105'A and 105'B. The water treated by the system 10 fills a tank 17 via the pipes 21, 22 and 23 by passing through the circuit 105'A of the UV lamp 105'. The water stored in the tank 17 can flow in the circuit 105'A by using the pump 101' and the pipe 26. Pipes 26 and 21 enter the single pipe 22, which supplies the circuit 105'A. The water that comes from the tank 17 and the pump 101 is purified by a purification component 12 before passing by a pipe 24 through the circuit 105'B of the UV lamp 105' and arriving at the point of use via a pipe 25. No circulation of that water is provided for.

Thus U.S. Pat. No. 4,969,991, illustrated by FIG. 3, describes the in-line use of a UV lamp 105' having two separate streams, one stream being used for treating the water filling the tank 17 and another stream being used for dispensing the water directly at the point of use 25.

According to this configuration, the UV lamp is only in use (switched on) during the cycles of water extraction and of intermittent circulation. The pipe 26 between the production system 10 and the tank 17 does not make it possible to eliminate all possibility of back-contamination or cross-contaminations between the production circuit and the dispensing circuit. Furthermore, this configuration is complex and costly, since it requires additional hardware such as two pumps and a separate-stream UV lamp.

The systems 13, 13' and 13" of the prior art all require regular decontamination of the flow loops and lines, for example every 1 to 3 months. This decontamination is generally carried out by cleaning with hot water or with at least one chemical product chosen from among chlorine, peroxide or any other oxidizing component. This decontamination must be carried out by a qualified technician, which complicates the use of the water purification system while notably increasing the cost.

There are other methods using filters, which are practically single-use filters. These filters are replaced after each use or after a very low number of uses.

Furthermore, the presence of the UV lamp does not enable all the contamination problems to be solved, such as for example cross-contaminations or back-contaminations by potentially "contaminated" water. It is moreover extremely difficult to constantly maintain a very low level of bacteria during use, especially when the water stagnates in the circuit, for example in a tank, because, the user no longer extracts purified water and the lamp is extinguished. This is true even if the water from the tank intermittently flows in a UV lamp, since droplets of water from condensation are present on the upper part of the tank, which are rich in bacteria, and contaminate the water of the tank when they fall, which means that the freshly sterilized water arriving in the tank is contaminated again.

Thus, the problem which arises is to design and produce a water purification system enabling purified water to be dispensed while ensuring a minimum of microorganisms (generally less than 100 CFU/L) and while adapting both to the rate of treated water production flow and to the rate of use, of the purified water desired by the user. CFU means "Colony Forming Unit".

To be precise, whatever the cadence of extraction of purified water from the purification circuit, the user must at all times have purified water available. Furthermore, stoppage of the system for decontamination must be the least frequent possible.

The system according to the invention advantageously enables an efficient solution to be provided, and the drawbacks of the prior art devices to be mitigated.

To that end, one of the aspects of the invention concerns a treated water purification system comprising a closed loop for water flow, said loop comprising at least one treated water supply point, at least one point of use of purified water, at least one pump means, at least one means for sterilization by UV radiation defining a zone for sterilization by UV, and at least one filtration means, the system being characterized in that the zone for sterilization by UV comprises the supply point and, furthermore, at least one purified water extraction point, situated upstream of the supply point in the direction of flow in the loop, and in that the extraction point and the supply point are both situated in a sector of the UV sterilization zone, said sector being isolated from the two connection points of the loop to the sterilization zone by two other sectors of the UV sterilization zone.

The point of extraction of purified water is generally associated with at least one extraction means. It may also serve, as will be explained below, for making water re-circulate in the loop, which is another means of supplying the loop.

The means for sterilization by UV is generally a UV lamp. Most often, the UV sterilization zone is a device comprising an envelope or casing containing the UV lamp. This device is typically equipped with four connection points over its length, thereby delimiting three sterilization sectors. Most often, the UV radiation sterilization zone is situated upstream of the point of use, in the direction of flow of the water in the loop.

The pump means is generally at least one pump.

The filtration means is generally at least one filter, preferably a final filter, such as a microporous or ultrafiltration filter, that is upstream of and very close to the point of use.

The two points of connection of the loop to the sterilization zone are generally an upstream point (M) and a downstream point (V), the upstream connection point preceding the downstream connection point in the direction of flow of water in the loop.

The invention thus cleverly makes it possible to produce a secondary flow loop, within which there is no dead zone or link to the treated water supply circuit that is unprotected against bacterial contamination, by virtue of the configuration and location of the different sectors in the UV sterilization zone and of the points of extraction and supply. It is the presence of a continuously active (switched on) UV barrier, situated at the boundary between the purified water flow loop and the supply circuit or even the circuit for re-circulating treated water, that enables the water flowing in the secondary loop to be kept at a very low level of bacterial contamination (less than 1 CFU/mL in the loop and 100 CFU/L at the point of use) while avoiding in particular back-contamination or cross-contaminations.

According to the invention, "treated water" means water from the method of treating water of the primary loop and "purified water" means water treated by the method of purifying water of the second loop.

Furthermore, "decontamination" means the action of eliminating living or pyrogenic components that may be present. This action is generally carried out at particular times. In the context of the invention, "sterilization by UV" is used to mean the action of destruction, generally in continuous operation, of the living elements by means of ultraviolet radiation or radiations.

Lastly, according to the invention, "purification" means the elimination of contaminants which may be particulate, ionic, organic or living. As is known to the person skilled in the art, purification techniques may be very different according to the type of contaminant: reverse osmosis (for ionic or organic contaminants), ion exchange resins (for ionic contaminants), activated charcoal (for organic contaminants), filtration (for particles and/or for living contaminants), ultrafiltration (for living contaminants and/or bacterial sub-products and/or pyrogens), UV (for living contaminants, if the ultraviolet radiation is at 254 nm, which is most often the case, and for organic contaminants if the ultraviolet radiation is at 185 nm.

The closed loop for purified water flow according to the invention is also called the secondary loop, or more simply here, loop. The system according to the invention is a true closed loop system, designed with continuous flow of the water in that loop. As the water flowing in and entering into the loop always passes by the sterilization zone, the water flowing in the loop is purified continuously.

In the context of the invention, at least one extraction of purified water from the loop at the point of extraction is made. A supplement of water may also be provided, if necessary, which water will be sterilized by passage in the sterilization zone. Lastly it is also possible, preferably at separate times, to perform the extraction of purified water and provide the supplement of water at that same extraction point. Thus different possibilities are used depending both on the flow of treated water supplying the loop and on the flow of water drawn off by the user.

The flow in the loop is generally greater than or equal to the flow of purified water desired by the user. The flow of water extracted by the user is generally variable, and may be sequenced.

The production rate of treated water entering the system according to the invention to supply the loop may be equal to or greater than the flow of purified water dispensed. In this case, the excess production of treated water is, according to the invention, generally placed in storage or recycled, for example in the circuit for production of treated water.

The production rate of treated water entering the system according to the invention to supply the loop may also be generally less than the flow of purified water dispensed. In this case, it is generally possible to increase the flow of water supplying the loop, according to an embodiment of the invention, by the addition of water purified by the system and placed in storage. This possibility of placing excess purified water in storage, for example in a tank, to then be able to use it as a supplement, is one of the advantages of one of the preferred embodiments of the system according to the invention.

The placing water in storage is carried out at the point of extraction in the UV sterilization zone, which is different from the point of supply of treated water, and enables the purified water to be sterilized, whether in excess mode or in supplement mode.

The water extraction point thus makes it possible to route the excess purified water for placement in storage to a tank and/or to the inlet of a treated water production system, whether it be the one supplying the loop or not.

According to a first embodiment, the extraction point is adapted to enable purified water to be placed in storage, generally in at least one tank, with passage beforehand in a sector of the sterilization zone, reducing the possibility of bacterial contamination of the tank. Thus, the system according to the invention further comprises at least one storage tank. Such a tank is generally open to the atmosphere and is capable of being supplied by the extraction means. This advantageously enables the loop to be connected to the atmosphere. Connection to the atmosphere of the purified water in the tank thus advantageously makes it possible to vent to the atmosphere any residual gas flowing in the sterilization zone most often coming from the purging of the filtration means of the loop.

In such a case, preferably, the system comprises at least one additional means for UV sterilization of the tank, preferably placed within said tank or even immersed in the tank. This additional sterilization means is adapted to sterilize the liquid potentially present in at least one part of the tank, as well as the non-immersed walls of the tank that are potentially contaminated by condensation coming from that liquid.

According to a second embodiment, the extraction point is adapted to enable water to be at least partially recycled in a treated water production system, preferably in the primary circuit supplying the system according to the invention. This is carried out with prior passage in a sector of the sterilization zone, which reduces the possibility of bacterial contamination of the primary circuit. In this case, the system according to the invention comprises at least one recycling pipe capable of being supplied by the extraction means, and adapted to supply at least one treated water production system.

Advantageously according to the invention, the flow loop preferably has no dead zone or link to the treated water supply circuit that is unprotected against bacterial contamination, by virtue of the configuration and location of the different sectors in the UV sterilization zone and of the points of extraction and supply and optionally of use, and wherein the UV zone is a continuously active UV barrier, situated at the boundary between the purified water flow loop (secondary circuit) and the supply circuit (primary circuit), that enables the water flowing in the secondary loop to be kept at a very low level of bacterial contamination of less than 1 CFU/mL in the loop and 100 CFU/L at the point of use.

According to the invention, the extraction means may also serve both to supply a tank and to supply a treated water production system, by combining the first and second preceding embodiments.

The pump means and the filtration means are generally successively disposed on the loop, in the direction of flow of the water in the loop, in the loop part going from the supply point to the extraction point, preferably in the loop part going from the supply point to the point of use.

The invention thus cleverly makes it possible to produce a secondary flow loop, within which there is no dead zone or link to the treated water supply circuit that is unprotected against bacterial contamination, by virtue of the creation of three different sterilization sectors in the UV sterilization zone.

Each sterilization means placed on the loop and the additional sterilization means which may possibly be placed on and/or in the tank, generally comprises at least one UV lamp, that is to say a mercury vapor lamp, or a discharge lamp (for example a xenon lamp), or else at least one LED (Light-Emitting Diode). The sterilization means emits ultraviolet radiation having bactericidal properties. According to the invention, the sterilization means is generally continuously active (switched on) to create a continuous barrier against the passage of bio-contaminants, which are essentially bacteria, between the (primary) production circuit for treated water and the (secondary) circuit or loop for purified water.

Furthermore, back-contaminations or cross-contaminations are typically not possible, as the exchanges between the fluids of the secondary loop and the treated water production circuit always occur in a UV sterilization zone. This is one of the advantages of the invention.

The configuration of the sectors of the sterilization zone advantageously also enable the cooling of the fluid flowing in the loop. To be precise, the fluid is heated mainly by the energy dissipated by the UV lamp, typically to 25-40° C., which is disadvantageous to the development of bacteria. According to the invention, this fluid is advantageously cooled by mixing with the supply water, in at least one of the sectors.

Consequently, it is possible according to the invention to decontaminate the loop, by passing hot water or a chemical product, at a much lower frequency than according to the prior art, typically only every six to twelve months.

The pump means is most often a pump. Furthermore, the pump means is preferably associated with a check means present on the loop, said check means preferably being a check valve (or relief valve). The pump means advantageously enables the desired quantity of purified water to be provided at the point of use and to maintain a stream within the closed flow loop by compensating for the head losses specific to the filtration and hydraulic circuit components.

The filtration means is generally a filter component or filter, most often preferably an absolute filter comprising at least one membrane, for example a filter comprising a membrane of pore diameter 0.22 μm or 0.1 μm. This filter is preferably situated at the point of use. This filter is preferably associated with a diversionary pipe, which is a purging pipe, linked to the loop. When the filter comprises a membrane, said pipe is situated upstream of the membrane, in the direction of flow of the water in the loop.

When the filtration means is a filter comprising a membrane, it generally comprises two pipes for connection to the loop. A first connection pipe is generally situated upstream of the filter membrane. It enables the entirety of the purified water flowing in the loop to flush the membrane when the drawing off from the point of use has ended, which advantageously eliminates the dead volume of water upstream of and on that membrane, exiting again by the second connection pipe, generally linked to the downstream side of the loop, which is returning from the loop, enabling the purging, i.e. the automatic evacuation, of any residual gas present at the membrane.

The filtration means is preferably situated on a diversion on the purified water dispensing loop. This advantageously enables complete separation between the loop and the point of use. The filtration means may also be situated in line on the loop, the water flowing in the loop passing through the filter, and the point of use being situated on the loop downstream of the filter. Nevertheless, in such a case, the point of use is not separated from the loop, for example by a membrane, and there is a risk of back-contamination of the water at the point of drawing off.

The point of use is generally situated at the location of the filtration means, and still more preferably on the filtration means. The filtration means is then referred to as "final". When the filter is a membrane filter, the point of use is preferably situated downstream of the membrane.

According to the invention, the system may furthermore comprise an additional filtration means, which is preferably an ultrafiltration filter, comprising at least one membrane. This ultrafiltration filter is defined according to the invention as a filter comprising a membrane whose cut-off threshold generally varies from 1,000 to 1,000,000 Da. The cut-off threshold is chosen by the person skilled in the art according to the performance sought. This ultrafiltration filter generally retains the molecules present in the fluid in which they may or may not be dissolved, the molecular weight constituting the determining factor in the retention on account of the choice of the membrane. In the context of the invention, the retention threshold is generally chosen to enable depyrogenation of the purified water.

The filtration means may also be a positively charged absolute filter, combining the properties of a final filter of 0.1 μm or 0.22 μm characteristic, and the properties of an ultrafiltration filter. To be precise, its positive charge enables the absorption of the pyrogens by affinity. This filter may possibly serve as a filtration means without the presence of an additional filtration means.

The additional filtration means is preferably situated downstream of the pump means and upstream of the filtration means, and such that a diversionary pipe links the additional filtration means to a point of the loop situated upstream of the sterilization zone. This diversionary pipe is generally a pipe for purging gases and, when the additional filtration means is a filter comprising at least one membrane, links the upstream of the membrane or membranes to a point of the loop situated upstream of the sterilization zone.

Thus, according to a preferred embodiment of the invention, the additional filtration means further comprises a diversionary pipe, which is a purging pipe, generally linking the filtration means (at a point situated upstream of the membrane when the additional filtration means is a membrane filter) and a point of the loop situated downstream of the point of use and upstream of the UV sterilization zone.

Advantageously, this diversionary pipe makes it possible to purge, that is to say to evacuate, the residual gases present.

The presence of this diversionary pipe enables automatic purging to be carried out, which is very advantageous. As a matter of fact, the existing purification systems only enable manual purging to be performed. However, that manual purging operation is difficult to perform, in particular when the user is not a qualified technician.

The diversionary pipe is generally configured such that the evacuation of the gases is carried out efficiently with a lower rate of flow of the water in said pipe and extracted from the loop. This generally implies maintaining an adequate linear speed in the different pipes of the loop in order to avoid any formation of a biofilm on their walls.

Thus, the diversionary pipe is generally and preferably configured such that any residual gas contained in the filtration means or the additional filtration means is transported by the water passing via that diversionary pipe, thereby evacuating that gas to the atmosphere, for example in a tank. Even though much less preferred in the context of the invention, it is also possible for the diversionary pipe to be such that any residual gas can also be partially evacuated in the diversionary pipe. In this case, the diversionary pipe comprises at least one gas evacuation means. The flow in the diversionary pipe may advantageously be limited such as for example by using a restricting means or by reducing the diameter of tube constituting the diversionary pipe.

Preferably according to the invention, the integrity of all the filtration means of the system of the invention has been tested, before commissioning, to 100%.

In an embodiment, the system according to the invention comprises at least one means for heating at least one part of the loop, generally adapted to heat the water flowing in the loop. This heating means may for example be a heating sleeve surrounding the UV sterilization means, for example when that sterilization zone is constituted by a casing of stainless steel containing a UV lamp. The heating means may be a heating element of resistance type. Most commonly, such an element is immersed and situated on the loop. The heating means may also be constituted by at least one heating element situated on the loop. This heating means advantageously makes it possible to decontaminate the loop with hot water, typically at a temperature greater than 85° C., using a predetermined cycle.

According to the invention, it is furthermore preferred for part of the system according to the invention, and more specifically the part of the loop comprising the filtration means and the adjoining circuit components, to be a set of consumable components. According to invention, "consumable components" means disposable components whose performance is qualified for a specific life or specific volume of purified water produced/dispensed at the point of use.

The consumable components are in general constituted by the filtration means and adjoining pipes.

The set generally forms a single part and if possible is delivered in its packaging in a condition which is sterile or decontaminated, by irradiation or other technique. This enables fast and easy changing of that consumable set using a simple mechanical connection means reducing the risk of contamination of the loop, or of the filtration component or components. The set has a limited life or a limited water treatment capacity, to ensure the integrity of its performance during its period of use. The set may also comprise a means for detection and recognition enabling its presence on the loop to be analyzed and to trace its life or the volume of treated water. The detection means may be in the form of an RFID tag, bar code, memory circuit or optical or mechanical polarizing device or other means.

The treated water production system which supplies the water purification system according to the invention in general comprises a reverse osmosis treatment device, to which may be added a deionizing step of ion exchange resin type or an electrodeionizing module.

The treated water produced flows into the sterilization zone at its arrival in the loop at the supply point, which advantageously makes it possible to notably reduce the bacterial contamination of the treated water at its arrival in the loop.

Advantageously, the system according to the invention makes it possible avoid the mutual contamination by microorganisms of the treated water and of the purified water.

To reduce the consumption of water and energy of the water treatment system, and/or to avoid a problem of temperature rise of the water in the loop during the long periods between two operations of drawing off, it is sometimes necessary to stop the treated water production system, as well as the dispensing pump of the loop. However, the sterilization means of the sterilization zone according to the invention must generally be continuously active, to keep active the barrier between the treated water production circuit and the loop. Furthermore, it may be advantageous to provide regular cycles of putting back into production and circulation in the loop to avoid the formation of biofilm and the development of microorganisms in the water treatment components and hydraulic circuit constituting the system. In practice, the UV lamp, which most often constitutes the sterilization means according to the invention, is generally continuously on.

Thus the level of bacteria, bacterial sub-products and bio-contaminants contained in the purified water obtained by the purification system according to the invention, conforms to the specifications of the AAMI (Association for the Advancement of Medical Instrument) and of the EP ("European Pharmacopeia") setting the limits for the water production:

Pure water for hemodialysis according to the AAMI RD62: 2006: less than 200 CFU per milliliter for microorganisms and 2 EU per milliliter for pyrogens;
Ultrapure water for according to the AAMI RD52: 2004: less than 100 CFU per Liter for microorganisms and 0.03 EU per milliliter for pyrogens;
Pure water according to the EP: less than 100 CFU/L for microorganisms and 0.25 EU/mL for pyrogens; and
Ultrapure water according to the EP: less than 100 CFU/L for microorganisms and 0.03 EU/mL for pyrogens.

The invention also concerns any use of the system according to the invention.

Thus the invention concerns a method of using such a system, the method consisting of a method of purifying treated water comprising making treated water flow in a closed water flow loop, the treated water entering by a supply point during at least one supplying step, said purifying comprising at least one filtering step, the filtering step preferably being a microfiltration step, and at least one step of sterilizing by at least one sterilization means, the purified water issuing from the method being extracted at the location of the filtering step, said method being characterized in that it comprises at least one step of extracting part of the water flowing in the loop, at an extraction point situated downstream of the filtering step, in the direction of flow of the water in the loop, and in that the sterilizing step is carried out continuously on the water flowing in the loop in a sector situated upstream of the extraction point, in a sector situated downstream of the extraction point and upstream of the supply point, and in a sector situated downstream of the supply point.

Advantageously, the method of purifying treated water according to the invention is such that the closed flow loop has preferably no dead zone or link to the treated water supply circuit that is unprotected against bacterial contamination, by virtue of the configuration and location of the different sectors in the UV sterilization zone and of the points of extraction and supply and optionally of use, and wherein the UV zone is a continuously active UV barrier, situated at the boundary between the purified water flow loop (secondary circuit) and the supply circuit (primary circuit), that enables the water flowing in the secondary loop to be kept at a very low level of bacterial contamination of less than 1 CFU/mL in the loop and 100 CFU/L at the point of use.

The method according to the invention is preferably performed continuously, that is to say that the water continuously flows in the loop. As the water flowing in and entering into the loop passes by the sterilization zone, the water flowing in the loop is purified continuously. The user draws of water continuously or discontinuously according to his needs.

The filtration step is carried out by at least one filtration means, preferably a membrane filter. In such a case, according to a preferred variant, the method is such that any residual gas coming from the filtration zone or zones is automatically vented to the atmosphere.

Preferably, the extracting step is associated with at least one step of placing in storage, typically in at least one tank open to the atmosphere.

In this case, according to a preferred embodiment, the method further comprises at least one step of reflowing (i.e. making to flow) in the loop a part of the water placed in storage, at the extraction point of the loop. This reflow generally enables supplemental water to be provided to ensure a sufficient rate of flow at the point of use of the loop.

The method according to the invention may comprise at least one step of heating the water flowing in the loop. This step generally serves for the decontamination of the purified water circuit by passing hot water, that is to say generally at a temperature greater than 85° C., during a decontamination cycle.

The method according to the invention may comprise at least one additional filtering step, which is preferably an ultrafiltration step.

In this case, the method according to the invention comprises at least two filtering steps and the purified water issuing from the method is extracted at the location of one of the two filtering steps. Preferably, the first filtering step is an ultrafiltration step. Preferably, the second filtering step is a microfiltration step.

According to a preferred embodiment, the method comprises at least one purging step, by causing part of the water flowing in the loop to flow in a diversion from the loop. This causing water to flow generally enables the evacuation of any residual gas at this purging step. This part of the water generally represents a small percentage of the total flow in the loop: the major part of the flow takes place in the loop.

Preferably this purging step is carried out at a filtering step. This advantageously enables the evacuation of any residual gas. This purging step is generally carried out continuously, any residual gas being evacuated to the atmosphere in relation with the filtering step. When the filtration means is a filter comprising at least one membrane, this purging step is generally carried out by diversion to a specific outlet upstream of the membrane or membranes of the filter. This purging step advantageously enables evacuation of the air present in the system (dissolved gases and air trapped in the filtration means enabling the filtering step to be carried out).

In a preferred embodiment, the method according to the invention comprises at least one step of evacuating any gas flowing in the loop to the atmosphere. In general, the gases come from the upstream side of the filtering step or steps. Preferably, this step is carried out by use of tanks.

Figure 4:
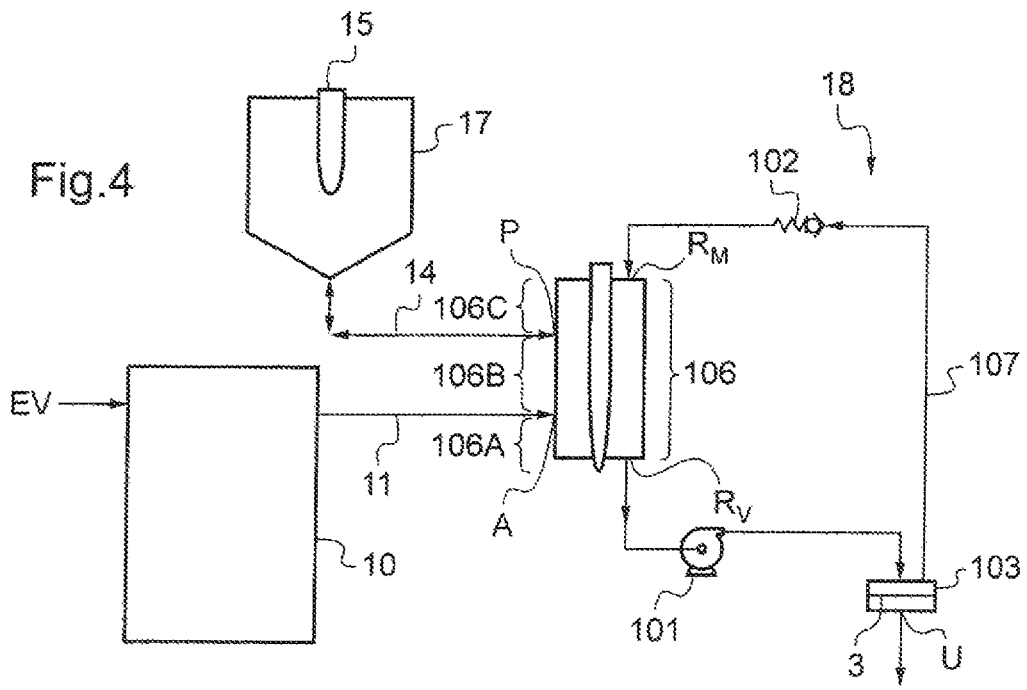
Figure 5:
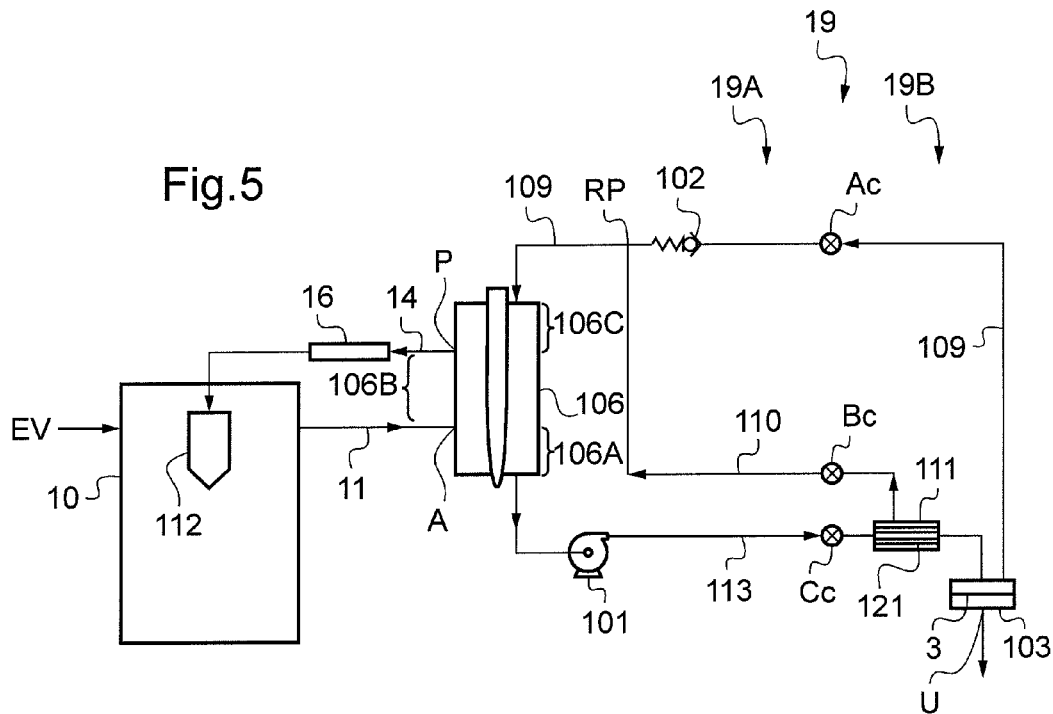
Figure 6:
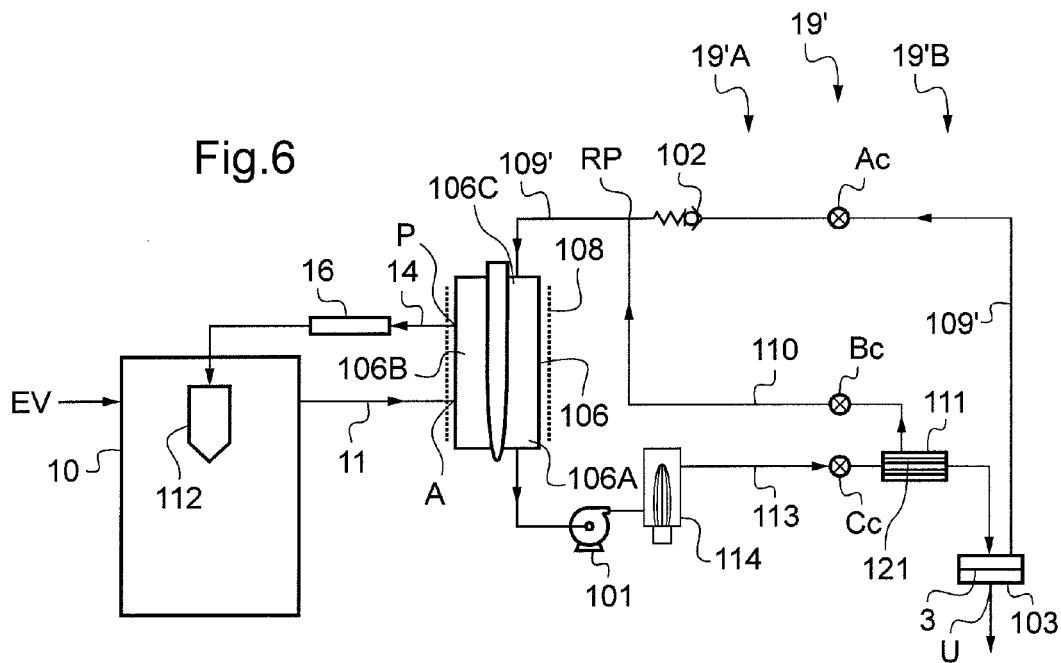

The invention will be better understood in the light of the accompanying drawings which include:

FIG. 1 is a diagram of a first system for water purification according to the prior art, FIG. 2 is a diagram of a second system for water purification according to the prior art, FIG. 3 is a diagram of a third system for water purification according to the prior art, FIG. 4 is a diagram of a system for water purification according to a first embodiment of the invention, FIG. 5 is a diagram of a system for water purification according to a second, embodiment of the invention, and FIG. 6 is a diagram of the water purification system according to FIG. 5, furthermore equipped with heating components for decontamination.

The same references represent identical components in the drawings.

FIGS. 1, 2 and 3 have been commented upon previously.

FIG. 4 presents a system 18 for water purification according to a first embodiment of the invention. The system 18 is associated with a system 10 for treated water production, for example by reverse osmosis and electrodeionization, using water, typically tap water, EV.

The system 18 comprises a tank 17 for storing purified water. The system 18 also comprises a pump means comprising a pump 101 associated with a valve 102, a microfiltration filter 103 comprising a membrane 3, and a UV sterilization zone 106, all disposed on a closed loop 107, for secondary flow. The filter 103 is on a diversion on the loop, and supplies a point of use U for drawing off purified water by a user.

The treated water of the treated water production system 10 enters by the line 11 into the flow loop 107, at a supply point A disposed in the UV sterilization zone.

A pipe 14 enables water to be extracted from the loop 107 at an extraction point P. This water corresponds to the excess purified water produced by the system 18 that is not used at the point of use U, which is placed in storage in the tank 17. The pipe 14 furthermore enables water to be returned at that same point P for supplementary supply of the purified water production system 18. Although not represented, the tank 17 may also be supplied by treated water issuing from the system 10 when the loop pump 101 is stopped.

The sector of the UV sterilization zone 106 which is situated downstream of point P, with regard to the direction of flow of purified water in the loop 107, is the sector 106A.

The sector of the UV sterilization zone 106 situated upstream of point P, in the direction of flow of the purified water in the loop 107, is the sector 106C of that zone 106.

Zone 106 is thus constituted by a sector 106A, a sector 106C and by an intermediate complementary sector 106B, situated between point P and the point A. Zone 106 is connected to the loop 107, of which it forms part upstream via the connection point $R_M$ and downstream via the downstream connection point $R_V$.

When no water is drawn off at the point of use U, the entirety of the purified water of loop 107 flows in the zone 106, maintaining a high level of sterilization of the water. During that time, the water produced by the system 10 is mixed with water coming from the loop 107 at point A. The water coming from the loop 107 has already been sterilized by passage in sector 106B (if it is the supplementary water at point P) or even in the sectors 106B and 106C (if it is water coming from the loop return). The mixture of water at point A is sterilized by UV sterilization sector 106A. The excess water produced by the system 10 and not drawn off the point U is thus extracted from the water flowing in the loop 107 at the point P, and placed in storage in the tank 17 after having passed through sector 106C.

During the drawing off, if the rate of flow of water drawn off at U is less than the rate of flow of water produced by the system 10, the water from the loop 107 flows through the sectors 106C and 106B of the sterilization zone 106 constituted by the UV lamp, before being mixed at point A with the water produced by the system 10. The excess water produced is stored in the tank 17 after its passage in the sterilization sector 106C. If the rate of flow of water extracted at U is greater than the rate of flow of water produced by the system 10 then sterilized in the sector 106A, the supplementary water coming from the tank 17 is supplied to the loop 107 via the pipe 14. The first part of the loop 107 in which it flows is the sector 106B, which advantageously makes it possible to avoid the risk of back-contamination of the loop 107 by microorganisms present in the tank 17.

In the device represented in FIG. 4, a UV lamp 15 is present within the tank 17. This lamp 15, by means of being regularly intermittently switched on (for example 4 times for 5 minutes per day), makes it possible to reduce the risk of bacterial proliferation within the tank 17. It is also the presence of the tank 17 which enables automatic purging to be carried out, by returning any residual gas flowing in the loop 107 to the atmosphere via the pipe 14.

FIG. 5 represents a system 19 for water purification according to a second embodiment of the invention. Relative to the system 18 represented in FIG. 4, this system 19 presents in particular a variant with regard to the filtration and with regard to the process of placing the excess treated water in storage by use for re-treatment thereof of the treated water production system 10.

Thus, system 19 is associated with the system 10 for treated water production which supplies the supply point A with treated water. System 19 comprises a flow loop 109, and is formed from a fixed part 19A and from a removable part 19B.

The loop 109 comprises a sterilization zone 106, a pump 101, a filter 103 at the location of which is situated, in a diversion, a point of use U, and a valve 102.

The system 19 further comprises an additional filtration component which is an ultrafiltration filter 111 comprising a membrane 121, and is situated downstream of the pump 101 and upstream of the filter 103, as well as a diversionary pipe 110 or purging pipe. The pipe 110 links the upstream side of the membrane 121 of the filter 111 to a point RP situated downstream of the valve 102 and upstream of the sterilization zone 106. This line 110 enables any residual gas to be flushed, in particular that present at the location of the membrane 121, by the flow of part of the extracted water in the pipe 113 which links the pump 101 to the filter 111. This diversionary line 110 comprises in particular a means for automatic evacuation (not shown) of any residual gas trapped upstream of the membrane 121. This means most often essentially consists of the positioning in space of the various components, filter(s) and pipes, to facilitate purging. The connection to the atmosphere in a tank 112 completes this automatic purge.

Furthermore, there are three hydraulic connection points Ac, Bc and Cc for a disposable part 19B. The inlet of the ultrafiltration filter 111 is connected to the connection Cc, its purging outlet is connected to the connection Bc and the loop return/purge for the final filter 103 leading towards the valve 102 is connected to the connection Ac. Consequently, it is possible, after having placed the system 19 on standby, to very easily separate the consumable part 19B, comprising the filtration components 103 and 111 and the tubes associated therewith, from the fixed part 19A and to mount a new part 19B, sterilized or decontaminated, to the points Ac, Bc and Cc. Thus, the filters and the tubes associated therewith are regularly replaced according to the recommended time of use, or else further to a water analysis showing a deterioration in the quality of the purified water produced.

The excess purified water in the loop 109 is extracted at an extraction point P situated in the zone 106, then passes via the pipe 14 by a closed tank 16 to absorb the peaks in demand for purified water prior to placing that water in storage. This tank 16 may quite simply be formed from a part of the pipe 14 if the volume of said part is sufficient.

The excess treated water coming from that tank 16 is recycled upstream of the treated water production system 10 in an open tank 112 which belongs to the system 10. The gases coming from the purging of the filters of the loop 109 are ejected to the atmosphere in the tank 112. This tank 112 enables automatic purging of the water flowing in the pipe 14 to be carried out.

In the case of the system 19 represented in FIG. 5, the rate of flow of drawing off at the point of use U of the purification system is limited to the rate of flow of the system 10 for production of treated water complemented by the supplement coming from the volume of the tank 16.

FIG. 6 is a diagram of a variant of the system 19' which is a variant of FIG. 5, and in which it is possible to program a cycle for decontamination of a purified water flow loop 109' according to the invention, with hot water. A heating sleeve 108 surrounding the UV sterilization zone 106, and/or, a heating element 114 disposed on the loop 109' enable(s) the water flowing in the loop 109' to be heated.

EXAMPLE

In Tables 1, 2 and 3 below, values for contamination were obtained using treated water coming from a system for water treatment by reverse osmosis (RO) and electrodeionization (EDI), by purifying it with a system 19 as represented in FIG. 5. The filter 111 comprises a single ultrafiltration membrane whose cut-off threshold is 13,000 Da and the filter 103 is an absolute filter the membrane of which has a pore diameter of 0.22 μm.

The power of the mercury vapor UV lamp is 17 W.
The operating rates of flow are:
Pump 101 and pipe 113: 1.8 L/min (constant)
Purging pipe 110: 0.2 L/min (constant)
Drawing off from the point of use U: 0.5 L/min (on average), 1.1 L/min (maximum)
Production of treated water entering the supply point A: 0.6 L/min (constant)

The measurements were made over a period of 135 days. The values obtained (on average) are presented in the following Table 1.

TABLE 1

| Contaminants | Treated water entering the loop | Water output from the UV zone 106 | Water from the point of use U |
|---|---|---|---|
| Bacteria (CFU/Liter) | 10000-30000 | <1000 | <100 |
| Endotoxins (EU/ml) | 0.0281 | 0.009 | <0.005 |

The bacterial performance is indicated in Table 2 below.

TABLE 2

| | LRV | Cumul LRV |
|---|---|---|
| Log Reduction Value RO/EDI (calculated relative to the quality of inlet water EV) | 1-1.5 | Not applicable |
| Log Reduction Value UV (calculated relative to the quality of treated water issuing from RO + EDI) | 0.5-1 | 2-2.5 |
| Log Reduction Value output from the point of use U (calculated relative to the quality of inlet water EV) | 2 | 3.5-4.5 |

The daily measurements are summarized in Table 3 below.

Water samples are taken from the outlet of the final filter using a sampling valve and the membrane filtration method (Millipore Milliflex with 0.45 μm pore size membrane).

After filtration, the membrane is incubated on growth media plate (R2A and TSA) during 5 days at 35° C.

After incubation time, the CFU on membrane are counted and noted on Table 3.

TABLE 3

| | R2A growth medium | | TSA growth medium | |
|---|---|---|---|---|
| Number of days | Standard deviation | CFU/L (average over 5 samples) | Standard deviation | CFU/L (average over 5 samples) |
| 5 | 4 | 7 | 5 | 13 |
| 7 | 10 | 20 | 5 | 18 |
| 9 | 7 | 42 | 5 | 50 |
| 12 | 7 | 38 | 9 | 35 |
| 15 | 12 | 32 | 9 | 33 |
| 17 | 7 | 45 | 6 | 28 |
| 22 | 11 | 36 | 11 | 36 |
| 29 | 3 | 22 | 4 | 20 |
| 31 | 1 | 11 | 4 | 8 |
| 38 | 4 | 14 | 9 | 14 |
| 42 | 5 | 17 | 6 | 19 |
| 45 | 4 | 11 | 2 | 4 |
| 49 | 5 | 12 | 5 | 12 |
| 52 | 2 | 6 | 2 | 4 |
| 55 | 8 | 9 | 8 | 11 |
| 57 | 5 | 8 | 3 | 9 |
| 65 | 5 | 11 | 7 | 12 |
| 70 | 4 | 10 | 6 | 7 |
| 72 | 8 | 11 | 7 | 14 |

TABLE 3-continued

| | R2A growth medium | | TSA growth medium | |
|---|---|---|---|---|
| Number of days | Standard deviation | CFU/L (average over 5 samples) | Standard deviation | CFU/L (average over 5 samples) |
| 81 | 4 | 5 | 2 | 2 |
| 85 | 3 | 8 | 4 | 8 |
| 101 | 25 | 33 | 21 | 30 |
| 108 | 2 | 3 | 2 | 2 |
| 116 | 2 | 4 | 2 | 2 |
| 124 | 9 | 8 | 4 | 6 |
| 135 | 5 | 13 | 9 | 9 |

The effectiveness of the system according to the invention can thus be seen, which is simple to use and which enables ultra-pure water to be produced in a way which is stable over time.

The invention claimed is:

1. A treated water purification system comprising a closed loop for water flow, said loop comprising: a water inlet supply connected to at least one UV radiation sterilizer having an upstream connection point and a downstream connection point; at least one pump directing water from said at least one UV radiation sterilizer via said downstream connection point to at least one filter, said at least one filter comprising a membrane having an upstream side and a downstream side; at least one point of use of purified water connected to said downstream side of said at least one filter; and a second connection pipe connecting said upstream side of said at least one filter to said upstream connection point of said at least one UV radiation sterilizer; wherein said at least one UV sterilizer has at least one treated water supply point through which said treated water enters via said water inlet supply, at least one purified water extraction point situated upstream of said at least one water supply point, and defines a zone for sterilization by UV, said zone comprising at least first, second and third sectors;
wherein the extraction point and the supply point are both situated in said first sector of the UV sterilization zone, said first sector being isolated from said upstream connection point and said downstream connection point by said second and third sectors of the UV sterilization zone, respectively, and
wherein said at least one filter is connected to said loop by two connection pipes: a first connection pipe situated upstream of said upstream side of said membrane and connected to said at least one pump, and said second connection pipe.

2. A system according to claim 1, further comprising at least one storage tank for purified water, wherein said storage tank is connected to said purified water extraction point by a recycling pipe.

3. A system according to claim 1, further comprising an open tank and at least one recycling pipe in fluid communication with said at least one purified water extraction point and with said open tank.

4. A system according to claim 1, wherein said loop further comprises a valve regulating the flow of water in said loop, said valve being positioned in said second connection pipe between said at least one filter and said upstream connection point.

5. A system according to claim 4, further comprising a second filter comprising a membrane having an upstream side and situated between said at least one pump and said at least one filter and connected to said at least one filter by a linking pipe, and a diversionary pipe linking said upstream side of the membrane to a point of the loop situated downstream of said valve.

6. A system according to claim 1, further comprising a second filter, which is situated between said at least one UV radiation sterilizer and said at least one filter, and such that a diversionary pipe links said second filter to a point of the loop situated upstream of said zone for sterilization.

7. A system according to claim 1, further comprising at least one heater disposed in the loop for heating at least one part of the loop.

8. A system according to claim 1, wherein the at least one filter is a single-use filter.

9. A method of purifying treated water comprising making treated water flow in a closed water flow loop, said loop comprising: a water inlet supply connected to a UV radiation sterilizer having an upstream connection point and a downstream connection point; at least one pump directing water from said UV radiation sterilizer via said downstream connection point to at least one filter separate from said UV sterilizer, said at least one filter comprising a membrane having an upstream side and a downstream side; at least one point of use of purified water connected to said downstream side of said at least one filter; and a second connection pipe connecting said upstream side of said at least one filter to said upstream connection point of said UV radiation sterilizer; wherein said UV radiation sterilizer has at least one treated water supply point through which said treated water enters via said water inlet supply, at least one purified water extraction point situated upstream of said at least one water supply point, and defines a zone for sterilization by UV, said zone comprising at least first, second and third sectors; wherein the extraction point and the supply point are both situated in said first sector of the UV sterilization zone, said first sector being isolated from said upstream connection point and said downstream connection point by said second and third sectors of the UV sterilization zone, respectively, and
wherein said at least one filter is connected to said loop by two connection pipes: a first connection pipe situated upstream of said upstream side of said membrane and connected to said at least one pump, and said second connection pipe;
the treated water entering said closed water flow loop by said at least one supply point during at least one supplying step and flowing into said UV radiation sterilizer and through said loop to said at least one point of use, said purifying comprising filtering said treated water with said at least one filter, sterilizing said treated water with said UV radiation sterilizer, the resulting purified water being extracted at said at least one point of use,
said method further comprising extracting part of the water flowing in the loop, at said at least one purified extraction point, and flowing said extracted water to said UV radiation sterilizer,
and wherein said sterilizing is carried out continuously on the water flowing in the loop in said first sector of said UV radiation sterilizer situated upstream of said extraction point, in said second sector of said UV radiation sterilizer situated downstream of said extraction point and upstream of said supply point, and in said third sector of said UV radiation sterilizer situated downstream of said supply point.

10. A method according to claim 9, further comprising placing the extracted water in storage.

11. A method according to claim 10, further comprising introducing at said extraction point of the loop, a part of the water that has been placed in storage.

12. A method according to claim 9, wherein said closed water flow loop further comprises a heater, said heater surrounding said UV radiation sterilizer, said method further comprising heating the water flowing in the loop with said heater.

13. A method according to claim 9, further comprising carrying out a second filtering step and wherein the purified water is extracted after either said second filter step or after said step of filtering said treated water with said at least one filter.

14. A method of purifying treated water according to claim 13, further comprising purging part of the water flowing in the loop by causing part of the water flowing in the loop to flow in a diversion from the loop.

15. A method of purifying treated water according to claim 9, further comprising evacuating any gas flowing in the loop to the atmosphere at a point in said second connection pipe downstream of said at least one filter and upstream of said at least one UV radiation sterilizer.

16. A system accordingly to claim 1, wherein there is only one UV radiation sterilizer in said loop.

* * * * *